(No Model.)

C. W. HOTTMAN.
MIXING MACHINE.

No. 426,619. Patented Apr. 29, 1890.

Witnesses:
Hans A. Fielm
A. V. Budd

Inventor
Charles William Hottman
by L. Lloyd Weigand
Attorney

THE NORRIS PETERS CO., PHOTO-LITHO., WASHINGTON, D. C.

UNITED STATES PATENT OFFICE.

CHARLES W. HOTTMAN, OF PHILADELPHIA, PENNSYLVANIA, ASSIGNOR OF TWO-THIRDS TO JOHN EPPLER AND JOHN KLENK, BOTH OF SAME PLACE.

MIXING-MACHINE.

SPECIFICATION forming part of Letters Patent No. 426,619, dated April 29, 1890.

Application filed June 5, 1889. Serial No. 313,234. (No model.)

*To all whom it may concern:*

Be it known that I, CHARLES WILLIAM HOTTMAN, a subject of the Emperor of Germany, at present residing at Philadelphia, in the county of Philadelphia and State of Pennsylvania, have invented certain new and useful Improvements in Mixing-Machines; and I do hereby declare the following to be a sufficiently full, clear, and exact description thereof to enable others skilled in the art to make and use the said invention.

This invention relates to machines for mixing ingredients of compounds, and has for its object the intimate and thorough incorporation of the ingredients with a small expenditure of power and simplicity of construction affording a facility of cleaning the apparatus.

The nature of this invention consists in the combination of a reciprocating stirrer provided with radiating arms, with a series of rotating arms so connected by an operating mechanism that, while they clear each other, they force the mass of material held within range of their action by a containing-vessel to repeatedly divide and redivide and turn all parts over, into, and through each other, and thus effectually compelling intimate and thorough mixing.

This invention is usefully applicable to the mixing of sausage and mince meats, medicine, paints, and colors, cements, mortar, and confections, creams, and, in short, every description of pulverulent or plastic compounds.

I will now proceed to describe this invention, referring in so doing to the accompanying drawings, in which—

Figure 2:
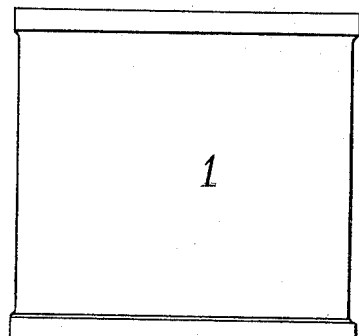
Figure 1:
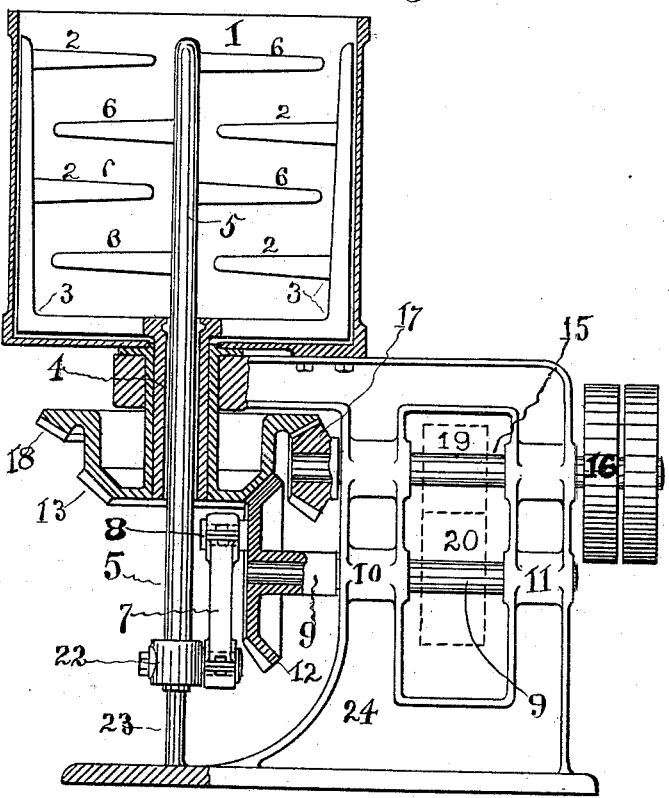
Figure 3:
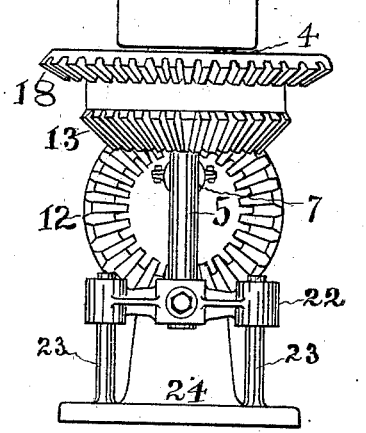

Figure 1 shows a lengthwise elevation of my mixer; Fig. 2, a front view thereof; Fig. 3, a section of a modification thereof, and Fig. 4 a front view of such modification.

The same reference-marks indicate like parts in the several figures.

1 is a cylindrical vessel open at the top, into which the ingredients to be mixed are placed.

2 are arms projecting inwardly from a revolving frame 3, turned by a hollow shaft 4, having its axis concentric with the cylindric vessel 1. In Figs. 1 and 2 the hollow shaft 4 passes upwardly through the bottom of the vessel 1, and in Figs. 3 and 4 it is placed above the vessel 1.

Through the hollow shaft 4 is fitted so as to slide lengthwise a reciprocating rod 5, having arms 6 radiating therefrom and located thereon so as to pass between the arms 2 on the frame 3.

The reciprocating motion of the rod 5 and arms 6 is imparted to the said rod and arms by a pitman 7 and crank-pin 8, turned by a cog-wheel 12 on a shaft 9 in bearings 10 and 11, secured to the frame 24.

The rod 5 is guided and prevented from turning by a cross-head 22, fitted to slide upon guides 23, secured to the frame 24.

Upon one end of the hollow shaft 4 is placed a beveled toothed wheel 13, secured to and turning the said hollow shaft 4.

Motion is imparted to the wheel 13 by the wheel 12, which meshes into it, and the number of teeth in the wheels 12 and 13 should either be equal to each other or else have such a common divisor that the paths described by the revolving arms 2 will not bring them into collision with the reciprocating arms 6.

Motion is imparted to shaft 9 either directly by a band-wheel 14 thereon, as shown in Fig. 3, or, as shown in Fig. 1, by a second shaft 15, driven by a band-wheel 16 and bearing a beveled pinion 17, engaging the teeth of a beveled wheel 18, attached to the wheel 13, which wheel 13 imparts motion to the wheel 12, or, as shown in dotted lines in Fig. 1, a pinion 19 on the shaft 15 engaging the teeth of a spur-wheel 20, secured to and turning the shaft 9.

The ingredients being placed in the vessel 1, are turned over and under and around in every direction by the arms 2 and 6 until thorough admixture ensues.

Figure 4:
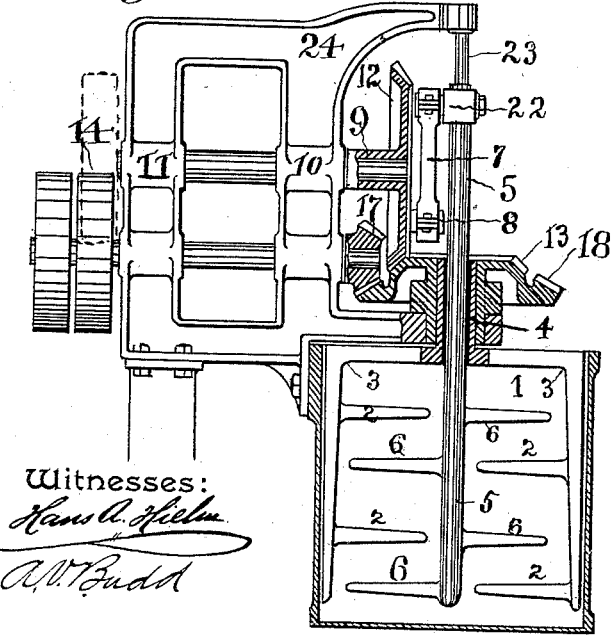
Figure 4:
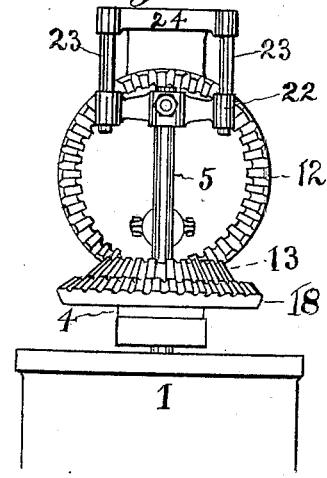

In the form shown in Figs. 3 and 4 the vessel can be lowered and emptied, and then the arms 2 and 6 can be cleaned with great facility in small machines. In large machines the vessel 1 may be emptied by a door or opening.

Having described my invention, what I claim is—

1. In a mixing-machine, the combination of the revolving frame 3, provided with inwardly-projecting radial arms, a hollow shaft 4, on which the frame is mounted, a reciprocating rod also provided with radial arms passing through the interstices between the radial arm on the revolving frame, the cylindrical vessel 1, and means for operating the shaft and rod, substantially as shown and described.

2. In a mixing-machine, the combination of the revolving frame 3, provided with radial arms, the reciprocating rod 5, also provided with radial arms, the cylindrical vessel 1, the hollow shaft 4, carrying the frame 3, beveled wheels 12 and 13, shaft 9, crank-pin 8, pitman 7, and cross-heads 22 and 23, whereby the said shaft and rod are operated, substantially as set forth.

CHARLES W. HOTTMAN.

Witnesses:
A. V. BUDD,
J. DANIEL EBY.